US012644824B2

(12) United States Patent
Mori et al.

(10) Patent No.: US 12,644,824 B2
(45) Date of Patent: Jun. 2, 2026

(54) TEST APPARATUS AND TEST METHOD

(71) Applicant: THE JAPAN STEEL WORKS, LTD., Tokyo (JP)

(72) Inventors: Takayuki Mori, Tokyo (JP); Seiya Hiramatsu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 395 days.

(21) Appl. No.: 18/290,447

(22) PCT Filed: Apr. 28, 2022

(86) PCT No.: PCT/JP2022/019400
§ 371 (c)(1),
(2) Date: Nov. 13, 2023

(87) PCT Pub. No.: WO2022/259784
PCT Pub. Date: Dec. 15, 2022

(65) Prior Publication Data
US 2024/0272063 A1 Aug. 15, 2024

(30) Foreign Application Priority Data

Jun. 10, 2021 (JP) ................................. 2021-097064

(51) Int. Cl.
*G01N 3/06* (2006.01)
*G01N 3/46* (2006.01)
(Continued)

(52) U.S. Cl.
CPC ............. *G01N 17/006* (2013.01); *G01N 3/46* (2013.01); *G01N 3/56* (2013.01); *G01N 2203/0682* (2013.01)

(58) Field of Classification Search
CPC .......... G01N 17/006; G01N 3/46; G01N 3/56; G01N 2203/0682; G01N 3/066;
(Continued)

(56) References Cited

U.S. PATENT DOCUMENTS 6,280,603 B1 8/2001 Jovancicevic

FOREIGN PATENT DOCUMENTS

CN 106338448 A 1/2017
CN 105784525 B 9/2018
(Continued)

OTHER PUBLICATIONS

International Search Report for International Patent Application No. PCT/JP2022/019400, Jul. 19, 2022.
(Continued)

*Primary Examiner* — Robert R Raevis
(74) *Attorney, Agent, or Firm* — Potomac Law Group, PLLC

(57) ABSTRACT

A test apparatus includes a container 2, a sample 12 and metal bodies 13 and 14 which are immersed in a solution 11 in the container 2, a jig 3, an ammeter 16, and a voltmeter 17. The sample 12, the metal body 13, and the metal body 14 are made of the same metal material and have the same surface area. While pressing the jig 3 rotating relative to the sample 12 against a surface of the sample 12, a current between the sample 12 and the metal body 13 is measured by the ammeter 16, and a voltage between the metal body 13 and the metal body 14 is measured by the voltmeter 17.

16 Claims, 7 Drawing Sheets

(51) Int. Cl.
　　*G01N 3/56*　　　　(2006.01)
　　*G01N 17/00*　　　(2006.01)

(58) Field of Classification Search
　　CPC ............. G01N 17/002; G01N 33/2045; G01N
　　　　　　　　　　　　2203/024; G01N 17/043
　　USPC ...... 73/7, 9, 78, 81, 87, 865.9, 865.6, 432.1;
　　　　　　　　　　324/629, 630, 71.1, 700; 436/6
　　See application file for complete search history.

(56)　　　　　　　References Cited

FOREIGN PATENT DOCUMENTS

| | | | |
|---|---|---|---|
| CN | 110006818 | A | 7/2019 |
| JP | H02-011783 | A | 1/1990 |
| JP | 2002-532681 | A | 10/2002 |
| JP | 2006-322808 | A | 11/2006 |
| JP | 2016-038355 | A | 3/2016 |
| JP | 2019-184364 | A | 10/2019 |
| WO | 2020/129070 | A1 | 6/2020 |

OTHER PUBLICATIONS

Extended European Search Report and European Search Opinion issued Mar. 27, 2025, in European Patent Application No. 22819970. 9.

Friedersdorf et al. "Pin-On-Disk Corrosion-Wear Test", Journal of Testing and Evaluation, American Society for Testing and Materials, Philadelphia, US., vol. 26, No. 4, Jul. 1, 1998, pp. 352-357, XP000784962, ISSN: 0090-3973.

TEST APPARATUS AND TEST METHOD

TECHNICAL FIELD

The present invention relates to a test apparatus and a test method, for example, a test apparatus and a test method for evaluating resistance of a metal material to wear and corrosion.

BACKGROUND ART

Japanese Unexamined Patent Application Publication No. 2006-322808 (Patent Document 1) discloses a technique related to a method and apparatus for testing corrosion and wear.

RELATED ART DOCUMENTS

Patent Documents

Patent Document 1: Japanese Unexamined Patent Application Publication No. 2006-322808

SUMMARY OF THE INVENTION

Problems to be Solved by the Invention

In a manufacturing apparatus of resin products, there is a fear that both wear and corrosion occur in the component parts of the manufacturing apparatus as the manufacturing apparatus operates. For example, an extrusion apparatus includes a cylinder and a screw built in the cylinder, and a resin material and the like are supplied into the cylinder and are kneaded by the rotating screw. At this time, there is a fear that the rotating screw rubs against an inner wall of the cylinder and the screw and cylinder are worn out. Further, there is also a fear that the screw and cylinder are corroded due to corrosive components contained in the resin material to be kneaded. Accordingly, in order to develop screws and cylinders with high resistance to wear and corrosion, it is necessary to be able to appropriately evaluate the resistance to wear and corrosion with respect to metal materials for screws and cylinders. Therefore, it is desired to provide a test apparatus and a test method capable of appropriately evaluating the resistance of metal materials to wear and corrosion.

Other problems and novel features will be apparent from the descriptions of this specification and accompanying drawings.

Means for Solving the Problem

According to an embodiment, a test apparatus includes: a container; a sample, a first metal body, and a second metal body which are immersed in a solution in the container; a jig; a current measuring unit; and a voltage measuring unit. The sample, the first metal body, and the second metal body are made of the same metal material and have the same surface area. The current between the sample and the first metal body is measured by the current measuring unit and the voltage between the first metal body and the second metal body is measured by the voltage measuring unit, while pressing the jig rotating relative to the sample against a surface of the sample.

According to an embodiment, a test method includes steps of: (a) preparing a test apparatus including a container and a sample, a first metal body, and a second metal body which are immersed in a solution in the container; and (b) measuring a current between the sample and the first metal body by a current measuring unit and measuring a voltage between the first metal body and the second metal body by a voltage measuring unit while pressing the jig rotating relative to the sample against a surface of the sample. The sample, the first metal body, and the second metal body are made of the same metal material and have the same surface area.

Effects of the Invention

According to an embodiment, it is possible to appropriately evaluate resistance of a sample to wear and corrosion.

BRIEF DESCRIPTIONS OF THE DRAWINGS

DETAILED DESCRIPTION OF PREFERRED EMBODIMENTS

Figure 1:
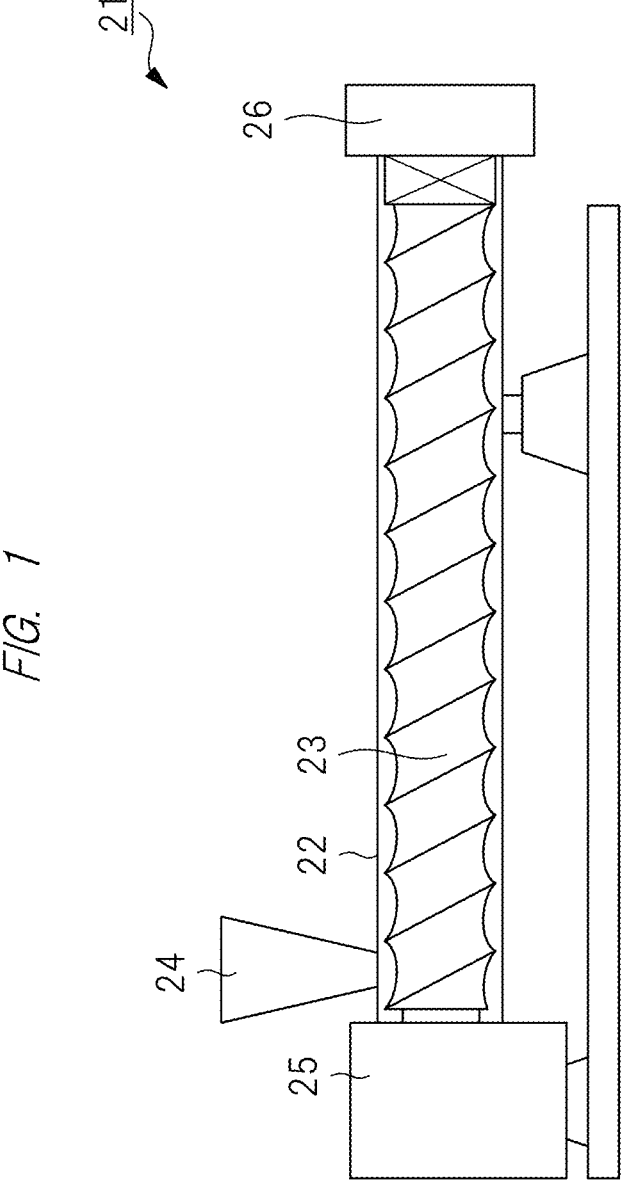
FIG. 1 is a schematic diagram showing an example of an extrusion apparatus.

Hereinafter, embodiments will be described in detail with reference to drawings. Note that the members having the same function are denoted by the same reference characters throughout the drawings for describing the embodiments, and the repetitive description thereof will be omitted. Also, in the following embodiments, the description of the same or similar parts will not be repeated in principle unless particularly required.

First Embodiment

<Background of Study>

In a manufacturing apparatus of resin products, there is a fear that both wear and corrosion occur in the constituent members (metal members) of the manufacturing apparatus as the manufacturing apparatus operates. This is because kneading of a resin material is necessary in order to manufacture resin products, but friction occurs on the constituent members (metal members) contributing to the kneading of the resin and the members are worn out as the manufacturing apparatus operates for the kneading. In addition, this is also because the constituent members (metal members) contributing to the kneading of the resin are corroded due to corrosive components contained in the resin material to be kneaded such as gas components generated from a flame retardant added to the resin material. Namely, there is a fear that both wear and corrosion occur in the constituent members (metal members) contributing to the kneading of the resin in the manufacturing apparatus of resin products.

FIG. 1 is a schematic diagram (side view) showing an example of an extrusion apparatus (extruder) 21. Note that, in FIG. 1, a screw 23 built in a cylinder 22 is shown so as to be seen through the cylinder 22 for ease of understanding.

As shown in FIG. 1, the extrusion apparatus 21 which is typical as a manufacturing apparatus of resin products includes the cylinder 22 and the screw 23 built in the cylinder 22. A resin material and the like are supplied into the cylinder 22 from a hopper (resin input unit) 24, and the resin material and the like are kneaded by the screw 23 rotated by a rotation drive mechanism 25. In the cylinder 22, the resin material kneaded and conveyed by the rotating screw 23 is extruded from a die (dice, mold) 26 attached to the tip of the cylinder 22.

The screw 23 is a constituent member (metal member) contributing to the kneading of the resin. During the operation of the extrusion apparatus 21, the rotating screw 23 rubs against an inner wall of the cylinder 22, so that wear of the screw 23 and the cylinder 22 may occur. In addition, corrosion of the screw 23 and the cylinder 22 may occur due to corrosive components contained in the resin material to be kneaded such as gas components generated from a flame retardant added to the resin material.

The inventors of this application have been involved in the development of the manufacturing apparatus of resin products (for example, extrusion apparatus), and resistance to wear and corrosion needs to be enhanced in the constituent members (metal members) contributing to the kneading of the resin in such a manufacturing apparatus. Therefore, it is required to be able to appropriately evaluate the resistance to wear and corrosion with respect to the metal materials used for the constituent members (metal members) contributing to the kneading of the resin. For example, in order to develop screws and cylinders with high resistance to wear and corrosion, it is required to be able to appropriately evaluate the resistance to wear and corrosion with respect to the metal materials for the screws and cylinders. Therefore, it is desired to provide a test apparatus and a test method capable of appropriately evaluating the resistance of the metal materials to wear and corrosion.

Accordingly, the inventors of this application have studied a test apparatus and a test method (evaluation method) for evaluating the resistance of metal materials to wear and corrosion.

<Test apparatus for Evaluating Resistance to Wear and Corrosion>

Figure 2:
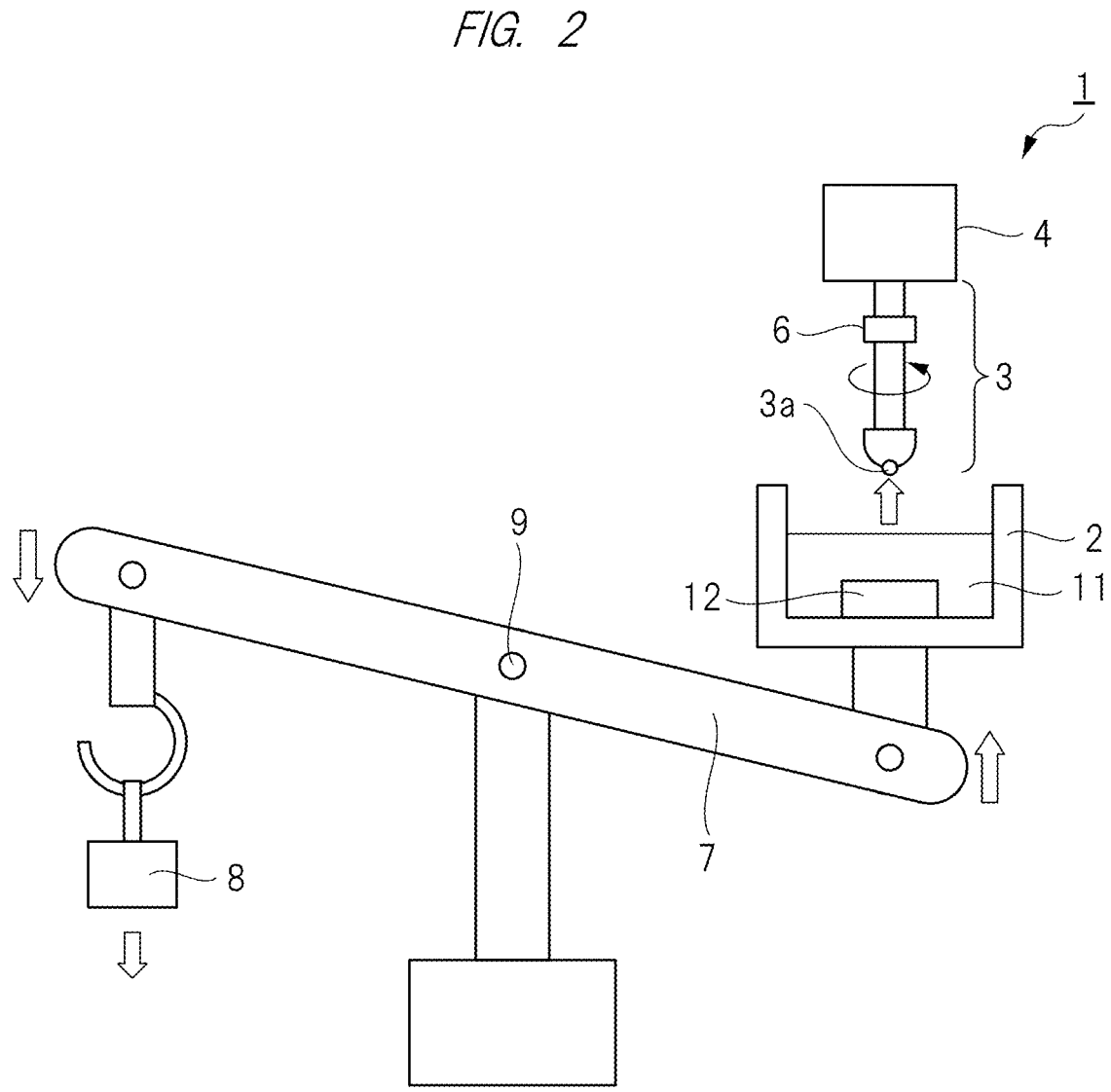
FIG. 2 is an explanatory diagram showing a test apparatus according to an embodiment.
Figure 3:
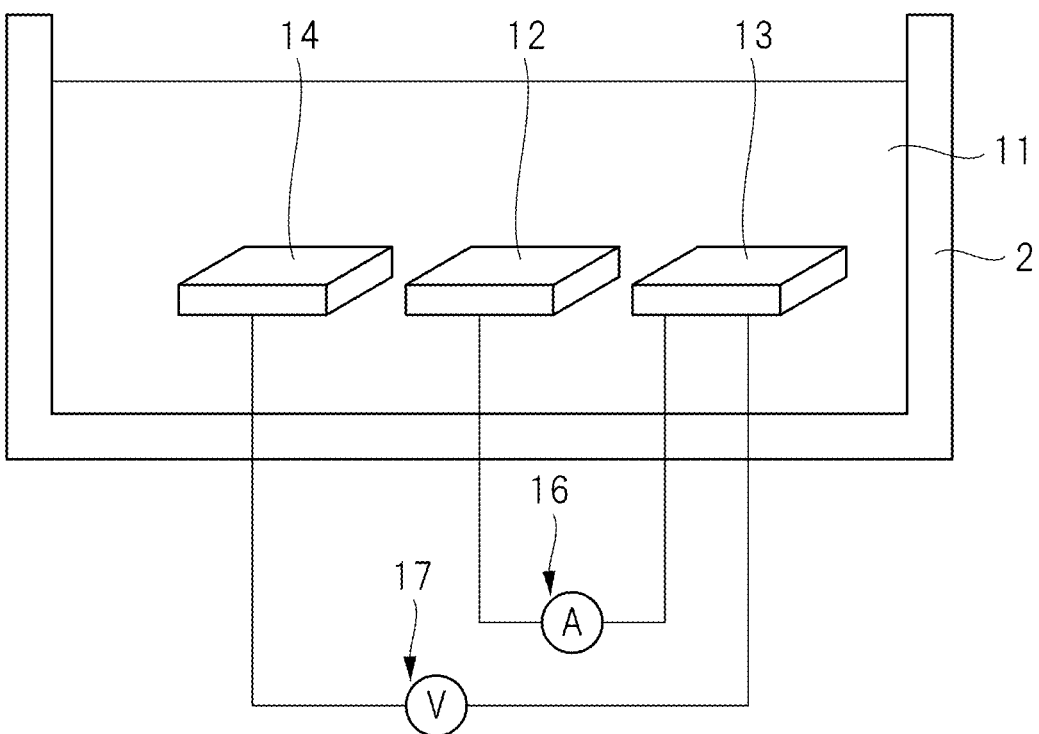
FIG. 3 is an explanatory diagram schematically showing a sample and metal bodies placed in a container of the test apparatus according to the embodiment.
Figure 4:
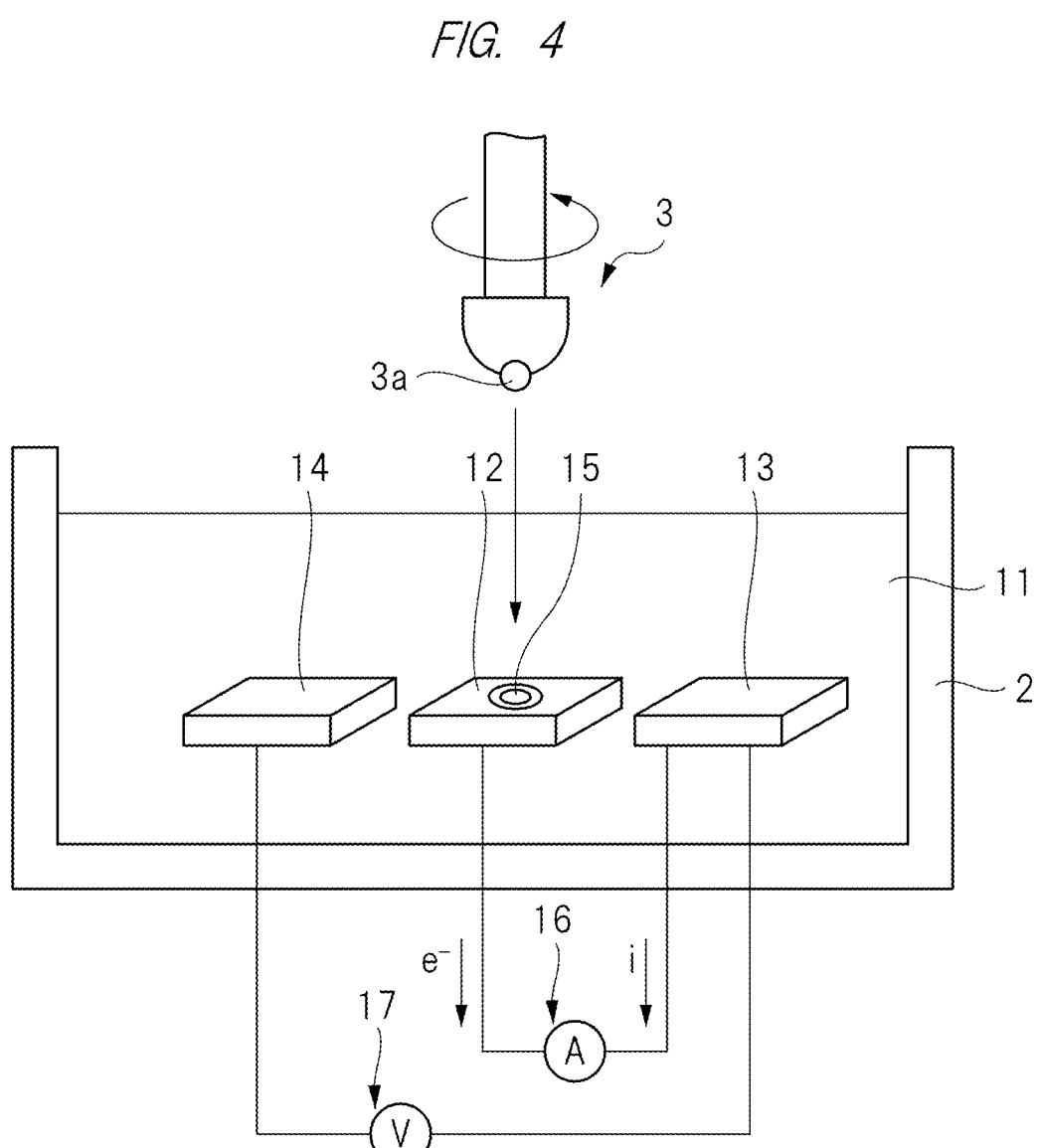
FIG. 4 is an explanatory diagram schematically showing the sample and the metal bodies placed in the container of the test apparatus according to the embodiment.

FIG. 2 is an explanatory diagram showing a test apparatus (evaluation apparatus) 1 according to the present embodiment. FIG. 3 and FIG. 4 are explanatory diagrams schematically showing a sample 12 and metal bodies 13 and 14 placed in a container 2 of the test apparatus 1. Note that, since FIG. 3 shows the stage before a tip portion (indenter 3a) of a rotating jig 3 is pressed (rubbed) against a surface of the sample 12, no wear mark 15 is formed on the surface of the sample 12 in FIG. 3. On the other hand, FIG. 4 shows the state in which the tip portion (indenter 3a) of the jig 3 rotating relative to the sample 12 is pressed (rubbed) against the surface of the sample 12, thereby forming the wear mark 15 on the surface of the sample 12.

The test apparatus 1 according to the present embodiment shown in FIG. 2 includes the container 2 and the friction jig 3. A solution (corrosive solution) 11 is stored in the container 2, and the sample (metal sample) 12 made of a metal material and the metal bodies 13 and 14 are immersed in the solution 11 stored in the container 2 (see FIG. 3). The sample 12 and the metal bodies 13 and 14 placed in the container 2 can be fixed to the container 2 so as not to move unneccessarily in the container 2. Although the metal bodies 13 and 14 are shown in FIG. 3 and FIG. 4, illustration of the metal bodies 13 and 14 is omitted in FIG. 2 for the sake of simplification.

The sample 12 is a test piece made of a metal material whose resistance to wear and corrosion is to be evaluated. The solution 11 stored in the container 2 is a solution (corrosive solution) that has a corrosive action on metal (metal material), and for example, an acidic solution (acidic aqueous solution) such as an aqueous sulfuric acid solution is preferably used. However, an alkaline solution (alkaline aqueous solution) may also be used.

The jig 3 is configured to be rotatable by a motor 4. The jig 3 rotates around the axial direction by the operation of the motor 4. The hard indenter 3a is attached (fixed) to the tip of the jig 3. It is preferable that the indenter 3a is made of a material having higher hardness than the sample 12. For example, an alumina ball or the like can be used as the indenter 3a. Further, a torque sensor 6 can also be attached to the jig 3. The indenter 3a can also be regarded as a part (tip portion) of the jig 3.

The container 2 is supported by one end of a lever 7. A weight 8 can be attached to the other end of the lever 7. The lever 7 is rotatable around a fulcrum (axis) 9 and can act as a so-called "leverage". The weight 8 attached to the other end of the lever 7 lowers the other end of the lever 7 (the end to which the weight 8 is attached), and raises the one end of the lever 7 (the end that supports the container 2), so that a force that lifts the container 2 upward is generated and a force that presses the sample 12 placed in the container 2 against the tip portion (indenter 3a) of the rotating jig 3 is generated. By adjusting the magnitude of the weight 8, it is possible to control the force that presses the sample 12 against the tip portion (indenter 3a) of the rotating jig 3, in other words, the force (load) that presses the tip portion (indenter 3a) of the rotating jig 3 against the sample 12.

In the case of the present embodiment, the sample 12 moves upward together with the container 2, and the sample 12 is pressed (rubbed) against the tip portion (indenter 3a) of the rotating jig 3. However, in terms of the relative relationship between the sample 12 and the jig 3, this is equivalent to that the tip portion (indenter 3a) of the jig 3 rotating relative to the sample 12 is pressed (rubbed) against the sample 12. On the other hand, in the case of the second embodiment described later, the tip portion (indenter 3a) of the jig 3 is pressed (rubbed) against the sample 12 rotating together with the container 2. However, in terms of the relative relationship between the sample 12 and the jig 3, this is also equivalent to that the tip portion (indenter 3a) of the jig 3 rotating relative to the sample 12 is pressed against (rubbed) the sample 12. Therefore, in both cases of the present embodiment and the second embodiment described later, the tip portion (indenter 3a) of the jig 3 rotating relative to the sample 12 can be considered as being pressed (rubbed) against the sample 12 in the container 2 (that is, in the solution 11).

By pressing (rubbing) the tip portion (indenter 3a) of the jig 3 rotating relative to the sample 12 against the surface of the sample 12 in the container 2 (in the solution 11), the surface of the sample 12 is worn out due to friction caused by the tip portion (indenter 3a) of the jig 3, and the wear mark 15 (see FIG. 4) is generated on the surface of the sample 12. The wear mark 15 is generated at the contact point of the tip portion (indenter 3a) of the jig 3 on the surface of the sample 12. The wear mark 15 is a dent formed by mechanical polishing (shaving) of the sample 12 due to friction caused by the tip portion (indenter 3a) of the jig 3 rotating relative to the sample 12.

The sample 12, the metal body 13, and the metal body 14 are each made of a metal material. These are characterized in that the sample 12, the metal body 13, and the metal body 14 are made of the same metal material and have the same surface area. As an example, the sample 12, the metal body 13, and the metal body 14 are all made of the same type of stainless steel, and the surface areas of the sample 12, the metal body 13, and the metal body 14 are the same.

The sample 12, the metal body 13, and the metal body 14 are immersed in the common corrosive solution 11, and specifically, are immersed in the corrosive solution 11 contained in the container 2. Also, the current flowing between the sample 12 and the metal body 13 can be measured by an ammeter (current measuring device, current measuring unit, DC ammeter) 16. Further, the voltage (potential difference) between the metal body 13 and the metal body 14 can be measured by a voltmeter (voltage measuring device, voltage measuring unit, DC voltmeter) 17. For this reason, the test apparatus 1 also includes the ammeter 16 as a current measuring unit and the voltmeter 17 as a voltage measuring unit. The ammeter 16 and the voltmeter 17 can be disposed outside the container 2. Alternatively, the voltage (potential difference) between the sample 12 and the metal body 14 may be measured by the voltmeter 17. Although the ammeter 16 and the voltmeter 17 are shown in FIG. 3, illustration of the ammeter 16 and the voltmeter 17 is omitted in FIG. 2 for the sake of simplification.

Of the sample 12, the metal body 13, and the metal body 14, the tip portion (indenter 3a) of the rotating jig 3 is pressed (rubbed) against the sample 12. The tip portion (indenter 3a) of the rotating jig 3 is not pressed (rubbed) against the metal bodies 13 and 14. Therefore, the wear mark 15 is generated on the sample 12, and no wear mark 15 is generated on the metal bodies 13 and 14.

<Test method for Evaluating Resistance to Wear and Corrosion>

Next, the method of evaluating (testing) the resistance of the sample 12 made of a metal material to wear and corrosion by using the test apparatus 1 according to the present embodiment will be described.

The sample 12 and the metal bodies 13 and 14 are fabricated (prepared) using a metal material whose resistance to wear and corrosion is to be evaluated. For example, a candidate of the metal materials to be used for the constituent members (for example, screw or cylinder) contributing to the kneading of the resin in the manufacturing apparatus of resin products (for example, extrusion apparatus) is selected, and the sample 12 and the metal bodies 13 and 14 are fabricated (prepared) using the candidate of the metal materials. The sample 12 and the metal bodies 13 and 14 may all be metal pieces (plate-like members), and they are made of the same metal material and have the same surface area. By making the sample 12, the metal body 13, and the metal body 14 have the same shape, the surface areas of the sample 12, the metal body 13, and the metal body 14 can be made equal to each other. For example, the sample 12 and the metal bodies 13 and 14 can be fabricated as plate-like members having the same planar dimensions (planar area). Note that no wear mark 15 is formed on sample 12 at this stage as shown in FIG. 3.

Then, the sample 12 and the metal bodies 13 and 14 are placed in the container 2 of the test apparatus 1, and the corrosive solution 11 is poured into the container 2. In this way, as shown in FIG. 3, the sample 12 and the metal bodies 13 and 14 are immersed in the solution 11 in the container

2. In principle, a so-called three-electrode method is used, in which the sample 12 functions as a working electrode, the metal body 13 functions as a counter electrode, and the metal body 14 functions as a reference electrode.

Then, as shown in FIG. 2 and FIG. 4, the jig 3 is rotated by the motor 4 and the container 2 is raised by the load of the weight 8, so that the sample 12 in the container 2 (in the solution 11) is pressed against the tip portion (indenter 3a) of the jig 3. As a result, the tip portion (indenter 3a) of the jig 3 rotating relative to the sample 12 is pressed (rubbed) against the sample 12 in the container 2 (in the solution 11) and the surface of the sample 12 is worn out due to friction caused by the tip portion (indenter 3a) of the jig 3, so that the wear mark 15 is generated on the surface of the sample 12 as shown in FIG. 4.

The ammeter 16 measures (monitors) the current flowing between the sample 12 and the metal body 13, and the voltmeter 17 measures (monitors) the voltage (potential difference) between the metal body 13 and the metal body 14. Monitoring by the ammeter 16 and the voltmeter 17 starts before the friction caused by the tip portion (indenter 3a) of the rotating jig 3 occurs on the sample 12, and is continued also while the friction caused by the tip portion (indenter 3a) of the rotating jig 3 is occurring on the sample 12.

Before the friction caused by the rotating jig 3 occurs on the sample 12, the measured value of the ammeter 16 (current flowing between the sample 12 and the metal body 13) and the measured value of the voltmeter 17 (voltage between the metal body 13 and the metal body 14) are basically zero or very small values because the sample 12, the metal body 13, and the metal body 14 are made of the same metal material and have the same surface area. This is because the amount of metal ions dissolved into the corrosive solution 11 is approximately the same among the sample 12, the metal body 13, and the metal body 14.

However, after the friction caused by the tip portion (indenter 3a) of the rotating jig 3 has occurred on the sample 12, the surface condition of the sample 12 changes due to the influence of the friction (wear mark 15 is generated), so that the amount of metal ions dissolved into the corrosive solution 11 from the sample 12 becomes different from the amount of metal ions dissolved into the corrosive solution 11 from each of the metal bodies 13 and 14. As a result, a current flows between the sample 12 and the metal body 13 and a voltage (potential difference) is generated between the metal body 13 and the metal body 14, and it is thus possible to measure (monitor) the current and the voltage by the ammeter 16 and the voltmeter 17.

As an example, the case in which it becomes easier that metal ions are dissolved into the solution 11 from the sample 12 because the wear mark 15 is generated on the sample 12 due to the influence of friction caused by the jig 3, and the amount of metal ions dissolved into the corrosive solution 11 from the sample 12 becomes larger than the amount of metal ions dissolved into the corrosive solution 11 from each of the metal bodies 13 and 14 will be considered. In this case, since electrons (corresponding to e-shown in FIG. 4) generated when the metal constituting the sample 12 is dissolved into the solution 11 to be metal ions move from the sample 12 to the metal body 13, a current (corresponding to current i shown in FIG. 4) flows from the metal body 13 to the sample 12, and this current is measured (monitored) by the ammeter 16. Furthermore, since electrons generated when the metal constituting the sample 12 is dissolved into the solution 11 to be metal ions move from the sample 12 to the metal body 13, the potential of the metal body 13 becomes lower than that of the metal body 14, and the potential difference therebetween is measured (monitored) by the voltmeter 17.

Therefore, at the stage after the friction caused by the rotating jig 3 has been generated on the sample 12, the surface condition of the sample 12 changes due to the influence of the friction (wear mark 15 is generated), so that a current flows between the sample 12 and the metal body 13 and a voltage (potential difference) is generated between the metal body 13 and the metal body 14. The measured value of the ammeter 16 (current flowing between the sample 12 and the metal body 13) and the measured value of the voltmeter 17 (voltage between the metal body 13 and the metal body 14) at this time are generated only by the change of surface condition of the sample 12 (generation of the wear mark 15) due to the influence of the friction. Therefore, it is possible to determine how the corrosivity of the sample 12 has changed by the change of surface condition of the sample 12 (generation of the wear mark 15) due to the influence of the friction, based on the measured value of the ammeter 16 (current flowing between the sample 12 and the metal body 13) and the measured value of the voltmeter 17 (voltage between the metal body 13 and the metal body 14). For example, when the measured value of the ammeter 16 and the measured value of the voltmeter 17 are large, it means that it becomes easier that the metal constituting the sample 12 is dissolved (ionized) into the solution 11 due to the influence of the friction, that is, it means that it becomes easier that the sample 12 is corroded due to the influence of the friction. Therefore, depending on whether the measured value of the ammeter 16 and the measured value of the voltmeter 17 after the friction caused by the rotating jig 3 has occurred on the sample 12 are large or small, how much the corrosivity of the sample 12 is increased due to the influence of the friction can be determined.

Figure 5:
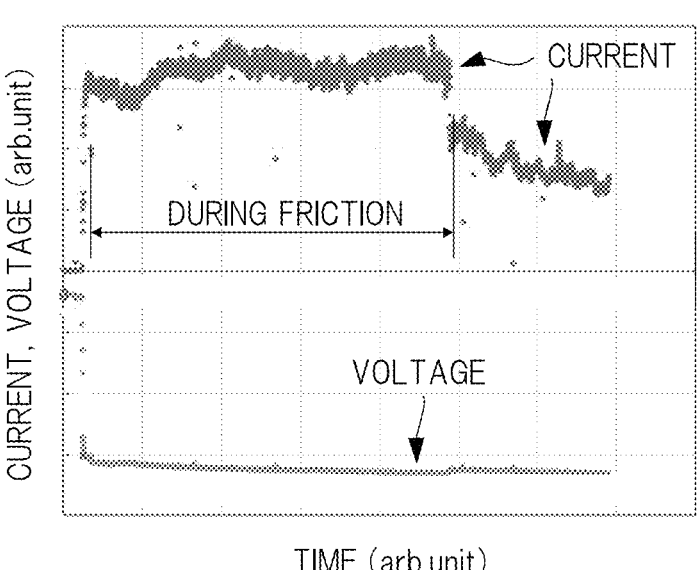
FIG. 5 is a graph showing an example of measured value of an ammeter and measured value of a voltmeter.

FIG. 5 is a graph showing an example of the measured value of the ammeter 16 (current flowing between the sample 12 and the metal body 13) and the measured value of the voltmeter 17 (voltage between the metal body 13 and the metal body 14). The horizontal axis of the graph in FIG. 5 corresponds to time, and the range indicated as "during friction" in the graph in FIG. 5 corresponds to the range in which the friction caused by the rotating jig 3 has occurred on the sample 12. The vertical axis of the graph in FIG. 5 corresponds to current (measured value of the ammeter 16) and voltage (measured value of the voltmeter 17). As can be seen from the graph in FIG. 5, the measured value of the ammeter 16 (current) and the measured value of the voltmeter 17 (voltage) are close to zero before the friction caused by the rotating jig 3 occurs on the sample 12, but a current flows between the sample 12 and the metal body 13 and a potential difference (voltage) is generated between the metal body 13 and the metal body 14 due to the change of the surface condition of the sample 12 (generation of the wear mark 15) when the friction caused by the rotating jig 3 occurs on the sample 12.

Furthermore, the resistance of the sample 12 to mechanical wear can be determined by measuring the dimensions (size) of the wear mark 15. For example, after pressing the tip portion (indenter 3a) of the rotating jig 3 against the surface of the sample 12 for a predetermined period of time, the sample 12 is taken out from the container 2 and the dimensions (size) of the wear mark 15 formed on the surface of the sample 12 are measured. At this time, the dimensions (size) of the wear mark 15 can be measured using, for example, a shape measuring machine. Alternatively, by photographing the surface or cross section of the sample 12, the dimensions (size) of the wear mark 15 can be measured from the surface photograph or the cross-sectional photograph thereof. Then, if the diameter and depth of the wear mark 15 are small, it can be determined that the sample 12 is not likely to be polished (worn) even when the tip portion (indenter 3a) of the rotating jig 3 is pressed against it, that is, it can be determined (found) that the resistance of the sample 12 to mechanical wear is high. Furthermore, if the diameter and depth of the wear mark 15 are large, it can be determined that the sample 12 is likely to be polished (worn) when the tip portion (indenter 3a) of the rotating jig 3 is pressed against it, that is, it can be determined (found) that the resistance of the sample 12 to mechanical wear is low.

Accordingly, by performing the above-described test using the test apparatus 1 for each of the first case in which the sample 12 and the metal bodies 13 and 14 are fabricated using a certain metal material A and the second case in which the sample 12 and the metal bodies 13 and 14 are fabricated using another metal material B, it is possible to determine (find) which of the metal materials A and B has higher resistance to wear and corrosion. The test is performed under the same test conditions for the first case and the second case. Specifically, in the first and second cases, the same solution 11 is used (same component and concentration), the jig 3 is rotated at the same rotation speed, the rotating jig 3 is pressed against the sample 12 with the same force (load), and the rotating jig 3 is pressed against the surface of the sample 12 for the same period of time. Also, it is preferable that the sample 12 has the same the shape (in particular, the surface area) in the first case and the second case. Then, if the dimensions (size) of the wear mark 15 are smaller in the second case than in the first case when the dimensions (size) of the wear mark 15 formed on the surface of the sample 12 are measured in each of the first case and the second case, it is determined (found) that the metal material B used in the second case has higher resistance to mechanical wear than the metal material A used in the first case. Furthermore, if the dimensions (size) of the wear mark 15 are smaller in the first case than in the second case, it can be determined (found) that the material A used in the first case has higher resistance to mechanical wear than the metal material B used in the second case.

In the first case and the second case, a current flowing between the sample 12 and the metal body 13 is measured (monitored) by the ammeter 16 and a voltage between the metal body 13 and the metal body 14 is measured (monitored) by the voltmeter 17 in the state where the tip portion (indenter 3a) of the rotating jig 3 is pressed against the surface of the sample 12. The measured value of the ammeter 16 (current flowing between the sample 12 and the metal body 13) and the measured value of the voltmeter 17 (voltage between the metal body 13 and the metal body 14) are compared between the first case and the second case. If the measured value of the ammeter 16 and the measured value of the voltmeter 17 are smaller in the second case than in the first case, it can be determined (found) that the corrosivity of the metal material B used in the second case is less likely to increase even when friction occurs and the metal material B has higher resistance to corrosion than the metal material A used in the first case. Furthermore, if the measured value of the ammeter 16 and the measured value of the voltmeter 17 are smaller in the first case than in the second case, it can be determined (found) that the corrosivity of the metal material A used in the first case is less likely to increase even when friction occurs and the metal material A has higher resistance to corrosion than the metal material B used in the second case.

Therefore, the sample 12 and the metal bodies 13 and 14 are prepared using various types of metal materials, and the above-described test using the test apparatus 1 is performed on each of them. It can be determined (found) that the resistance to mechanical wear is higher as the dimensions of the wear mark 15 are smaller. In addition, even if the dimensions of the wear mark 15 are small, it can be determined (found) that the resistance to corrosion is low when the current flowing between the sample 12 and the metal body 13 and the voltage between the metal body 13 and the metal body 14 are large in the state where the rotating jig 3 is pressed against the surface of the sample 12. Therefore, it is possible to find the metal material having high resistance to mechanical wear and chemical corrosion by finding the metal material (metal material used for the sample 12 and the metal bodies 13 and 14) in which the dimensions of the wear mark 15 are small and the current flowing between the sample 12 and the metal body 13 and the voltage between the metal body 13 and the metal body 14 are small in the state where the rotating jig 3 is pressed against the surface of the sample 12. By using such a metal material to fabricate the constituent members contributing to the kneading of the resin (for example, screw or cylinder), it is possible to improve the reliability and performance of the manufacturing apparatus of resin products (for example, extrusion apparatus).

Alternatively, by fabricating the sample 12 and the metal bodies 13 and 14 from a metal material to be a candidate used for the constituent members contributing to the kneading of the resin (for example, screw or cylinder) and performing the above-described test using the test apparatus 1, it is possible to evaluate the resistance of the metal material to mechanical wear and chemical corrosion. Accordingly, it can be determined whether the metal material to be a candidate is suitable for the constituent members (for example, screw or cylinder) contributing to the kneading of the resin. Therefore, it is possible to improve the reliability and performance of the manufacturing apparatus of resin products (for example, extrusion apparatus).

Here, the case in which the sample 12, the metal body 13, and the metal body 14 are made of different materials unlike the present embodiment will be assumed. In this case, even before the friction caused by the rotating jig 3 occurs on the sample 12, a current flows between the sample 12 and the metal body 13 due to the difference between the ionization tendency of the sample 12 and the ionization tendency of the metal body 13. Therefore, at the stage after the friction caused by the rotating jig 3 has occurred on the sample 12, the current flowing between the sample 12 and the metal body 13 and the voltage generated between the metal body 13 and the metal body 14 are not generated only by the change of surface condition of the sample 12 (generation of the wear mark 15) due to the influence of the friction, but reflect the difference between the ionization tendency of the metal material constituting the sample 12 and the ionization tendency of the metal material constituting the metal body 13. Therefore, it is difficult to accurately estimate how much the corrosivity (easiness of dissolution into the solution 11) of the sample 12 has changed due to the influence of the friction, based on the current flowing between the sample 12 and the metal body 13 and the voltage generated between the metal body 13 and the metal body 14.

Further, in the case where the sample 12, the metal body 13, and the metal body 14 are made of different materials, a current (internal current) may flow in the sample 12 due to the internal battery action when the friction caused by the rotating jig 3 occurs on the sample 12 and the wear mark 15 is formed on the sample 12, and the current flowing between the sample 12 and the metal body 13 may decrease by the amount of the internal current. In this respect as well, it is difficult to accurately estimate how much the corrosivity (easiness of dissolution into the solution 11) of the sample 12 has changed due to the influence of the friction, based on the current flowing between the sample 12 and the metal body 13 and the voltage generated between the metal body 13 and the metal body 14.

Further, the case in which the sample 12, the metal body 13, and the metal body 14 are made of the same material but the surface areas of the sample 12, the metal body 13, and the metal body 14 are different from each other will be assumed. In this case, at the stage after the friction caused by the tip portion (indenter 3a) of the rotating jig 3 has occurred on the sample 12, the current flowing between the sample 12 and the metal body 13 and the voltage generated between the metal body 13 and the metal body 14 are not generated only by the change of surface condition of the sample 12 (generation of the wear mark 15) due to the influence of the friction, but receive the influence due to the difference in surface area among the sample 12, the metal body 14, and the metal body 14. In this respect, it is difficult to accurately estimate how much the corrosivity (easiness of dissolution into the solution 11) of the sample 12 has changed due to the influence of the friction, based on the current flowing between the sample 12 and the metal body 13 and the voltage generated between the metal body 13 and the metal body 14.

In contrast, in the present embodiment, the sample 12, the metal body 13, and the metal body 14 are made of the same metal material and have the same surface area. Accordingly, at the stage after the friction caused by the tip portion (indenter 3a) of the rotating jig 3 has occurred on the sample 12, the current flowing between the sample 12 and the metal body 13 and the voltage generated between the metal body 13 and the metal body 14 are generated only by the change of surface condition of the sample 12 (generation of the wear mark 15) due to the influence of the friction. Therefore, it is possible to accurately estimate how much the corrosivity (easiness of dissolution into the solution 11) of the sample 12 has changed due to the influence of the friction, based on the current flowing between the sample 12 and the metal body 13 and the voltage generated between the metal body 13 and the metal body 14.

As described above, according to the test apparatus and the test method according to the present embodiment, it is possible to appropriately evaluate the resistance of metal materials to wear and corrosion. Accordingly, it is possible to select a metal material (that is, metal material with high resistance to wear and corrosion) suitable for the constituent member (for example, screw or cylinder) contributing to the kneading of the resin, and it is thus possible to improve the reliability and performance of the manufacturing apparatus of resin products (for example, extrusion apparatus).

Second Embodiment

Figure 6:
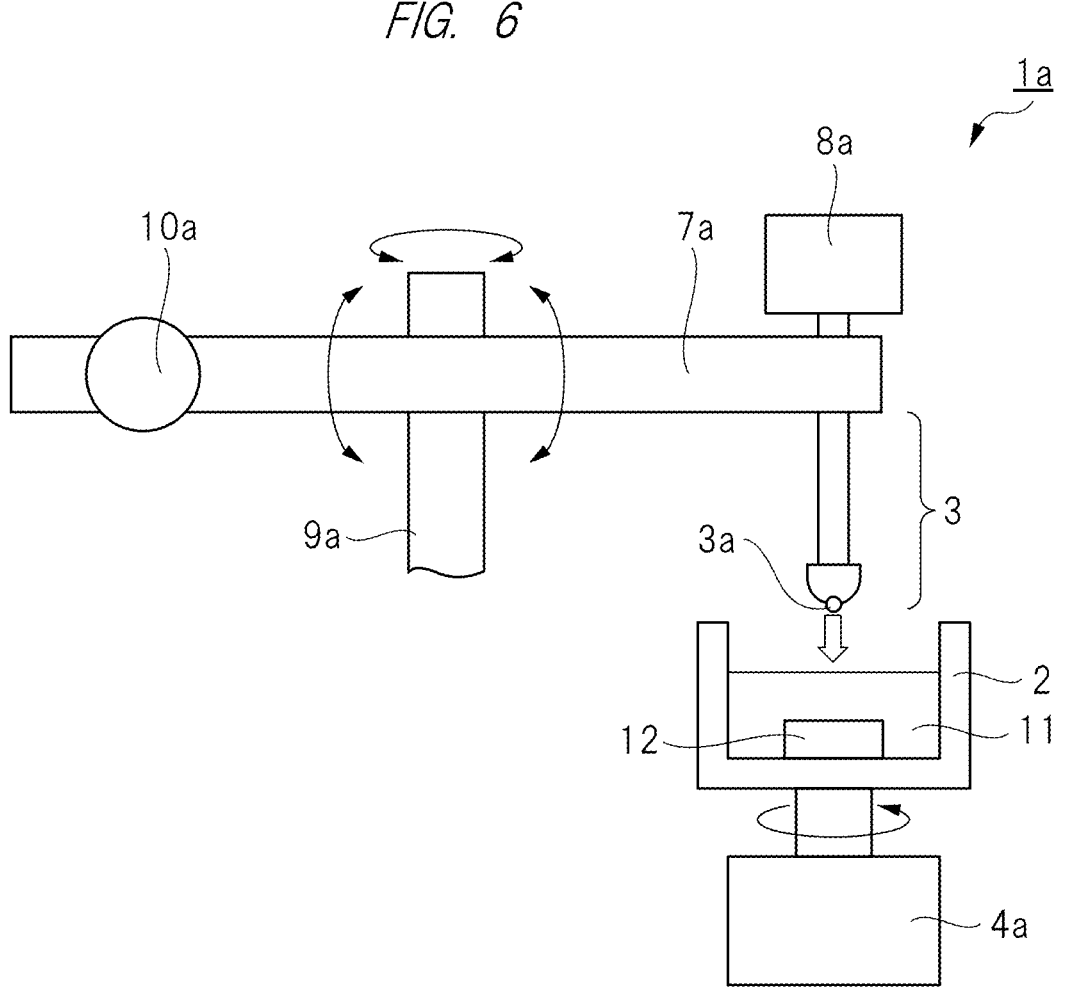
FIG. 6 is an explanatory diagram showing a test apparatus according to another embodiment.

FIG. 6 is an explanatory diagram showing a test apparatus (evaluation apparatus) 1a according to the second embodiment.

The main difference between the test apparatus 1 according to the first embodiment described above and the test apparatus 1a according to the second embodiment is that the friction jig 3 is rotated without rotating the sample 12 in the test apparatus 1 according to the first embodiment described above, but the sample 12 is rotated without rotating the friction jig 3 in the test apparatus 1*a* according to the second embodiment. In order to realize this, the test apparatus 1 according to the first embodiment described above and the test apparatus 1*a* according to the second embodiment differ in some configurations.

Specifically, the test apparatus 1*a* shown in FIG. 6 includes the container 2 and the friction jig 3, but a motor 4*a* rotates the container 2 instead of the jig 3. Namely, the container 2 is configured to be rotatable by the motor 4*a*. As in the test apparatus 1 according to the first embodiment described above, as shown in FIG. 3 and FIG. 4, the sample 12 and the metal bodies 13 and 14 are immersed in the solution 11 stored in the container 2 also in the test apparatus 1*a* according to the second embodiment. As in FIG. 2 above, illustration of the metal bodies 13 and 14, the ammeter 16, and the voltmeter 17 is omitted in FIG. 6 as well for the sake of simplification.

In the second embodiment as well, the sample 12, the metal body 13, and the metal body 14 are made of the same metal material and have the same surface area. The sample 12 and the metal bodies 13 and 14 placed in the container 2 can be fixed to the container 2 so as not to move unnecessarily in the container 2. The sample 12 placed in the container 2 rotates together with the container 2 when the container 2 is rotated by the motor 4*a*.

The hard indenter 3*a* is attached to the tip of the jig 3. The tip portion (indenter 3*a*) of the jig 3 is pressed (rubbed) against the surface of the sample 12 rotating together with the container 2, so that the surface of the sample 12 is worn out due to the friction caused by the tip portion (indenter 3*a*) of the jig 3, and the wear mark 15 is generated on the surface of the sample 12 as shown in FIG. 4 above.

As shown in FIG. 6, the jig 3 is supported by one end of a lever 7*a*. The lever 7*a* is rotatable around a fulcrum (axis) 9*a*, and can act as a so-called "leverage". Further, the lever 7*a* can also be made rotatable in the horizontal direction. A load cell 10*a* is provided on the other end of the lever 7*a*. The load cell 10*a* can also be used to measure the coefficient of friction when the tip portion (indenter 3*a*) of the jig 3 is pressed against the rotating sample 12. Further, a weight 8*a* for loading may be provided on the rear end side of the jig 3. By adjusting the magnitude of the weight 8*a*, it is possible to control the force (load) that presses the tip portion (indenter 3*a*) of the jig 3 against the rotating sample 12.

Figure 7:
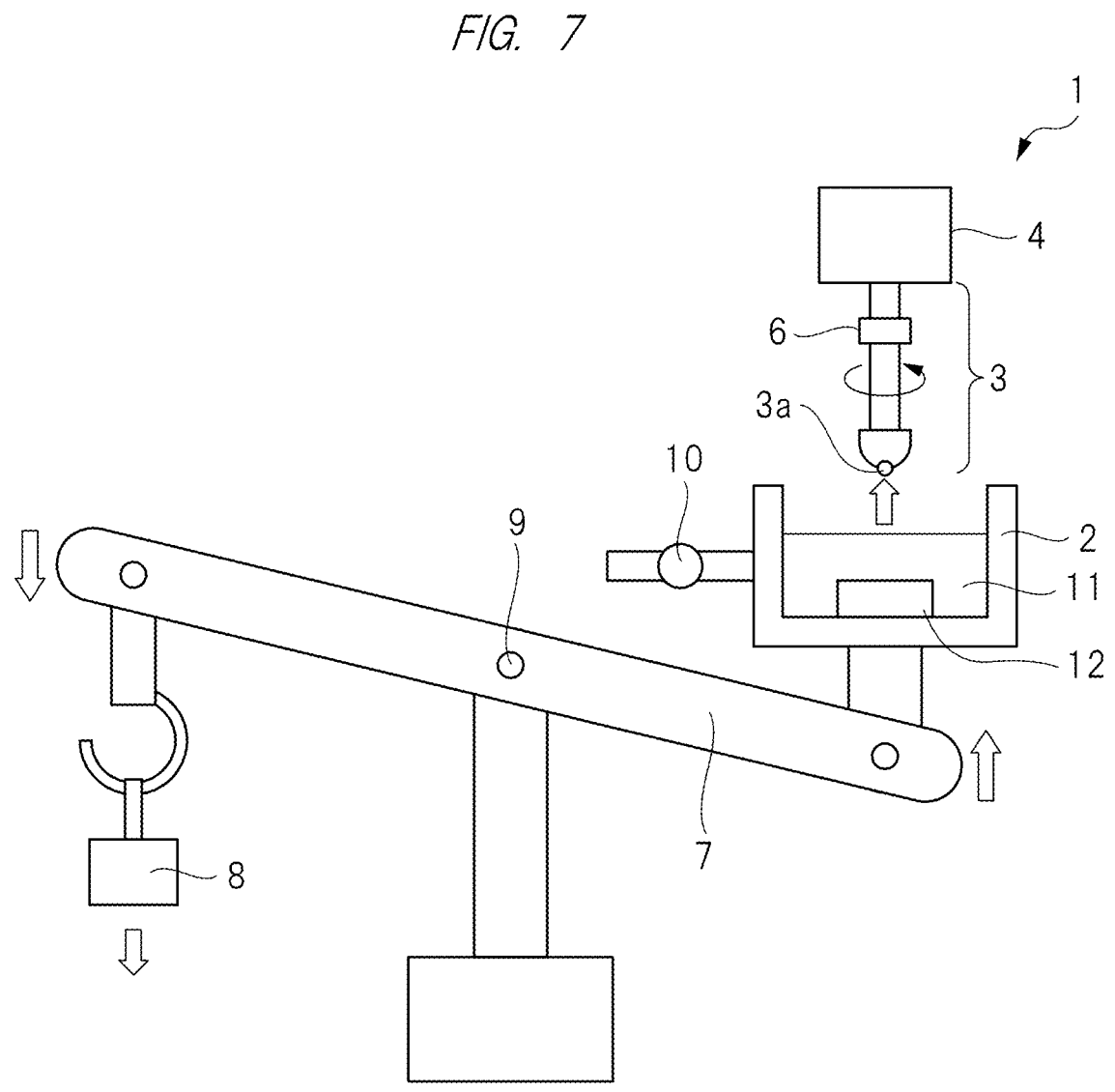
FIG. 7 is an explanatory diagram showing a modification of the test apparatus in FIG. 2.

Note that the load cell can also be used in the test apparatus 1 according to the first embodiment described above, and FIG. 7 shows this case. FIG. 7 is an explanatory diagram showing a modification of the test apparatus 1 according to the first embodiment described above, and the load cell 10 is provided on a bar connected to the container 2 in the case of FIG. 7.

In the first embodiment described above (FIG. 2 and FIG. 7), the friction jig 3 is rotated without rotating the sample 12, but the sample 12 is rotated without rotating the friction jig 3 in the second embodiment (FIG. 6). The first embodiment and the second embodiment have in common that the friction jig 3 rotates relative to the sample 12. Namely, in both the first embodiment and the second embodiment, the jig 3 pressed against the sample 12 rotates relative to the sample 12, so that the surface of the sample 12 is worn out due to the friction caused by the tip portion (indenter 3*a*) of the jig 3 and the wear mark 15 is generated on the surface of the sample 12.

As in the first embodiment described above, the current flowing between the sample 12 and the metal body 13 is measured (monitored) by the ammeter 16 and the voltage (potential difference) between the metal body 13 and the metal body 14 is measured (monitored) by the voltmeter 17 in the second embodiment as well.

The first embodiment described above and the second embodiment (FIG. 6) are different in that the friction jig 3 is rotated without rotating the sample 12 in the first embodiment and the sample 12 is rotated without rotating the friction jig 3 in the second embodiment. Except for that, the resistance of the sample 12 to wear and corrosion can be evaluated (tested) by using the test apparatus 1*a* according to the second embodiment in the same manner as the test apparatus 1 according to the first embodiment described above.

Since the ammeter 16 and the voltmeter 17 are disposed outside the container 2, wiring (conductor line) is required to electrically connect the ammeter 16 and the voltmeter 17 to the sample 12 and the metal bodies 13 and 14. Therefore, in the case of the first embodiment in which the container 2 does not have to be rotated, it is possible to easily electrically connect the ammeter 16 and the voltmeter 17 to the sample 12 and the metal bodies 13 and 14. On the other hand, in the case of the second embodiment in which the container 2 is rotated, for example, it is possible to electrically connect the ammeter 16 and the voltmeter 17 to the sample 12 and the metal bodies 13 and 14 by wiring by taking out the wiring (conductor line) connected to the sample 12 and the metal bodies 13 and 14 in the container 2 from the hollow motor 4*a* and connecting it to the ammeter 16 and the voltmeter 17.

In the foregoing, the invention made by the inventors of this application has been specifically described based on the embodiments thereof. However, it is needless to say that the present invention is not limited to the above-described embodiments and various modifications can be made within the range not departing from the gist thereof.

REFERENCE SIGNS LIST

1, 1*a* test apparatus
2 container
3 jig
3*a* indenter
4 motor
6 torque sensor
7, 7*a* lever
8, 8*a* weight
9, 9*a* fulcrum
10, 10*a* load cell
11 solution
12 sample
13, 14 metal body
15 wear mark
16 ammeter
17 voltmeter
21 extrusion apparatus
22 cylinder
23 screw
24 hopper
25 rotation drive mechanism
26 die

The invention claimed is:
1. A test apparatus comprising:
a container;
a sample, a first metal body, and a second metal body which are immersed in a solution in the container;
a jig configured to be pressed against the sample;
a current measuring unit configured to measure a current between the sample and the first metal body; and a voltage measuring unit configured to measure a voltage between the first metal body and the second metal body, wherein the sample, the first metal body, and the second metal body are made of the same metal material and have the same surface area, and wherein the current between the sample and the first metal body is measured by the current measuring unit and the voltage between the first metal body and the second metal body is measured by the voltage measuring unit, while pressing the jig rotating relative to the sample against a surface of the sample.

2. The test apparatus according to claim 1, wherein the sample is made of a metal material whose resistance to wear and corrosion is to be evaluated.

3. The test apparatus according to claim 1, wherein the sample is made of a metal material used for a constituent member contributing to kneading of a resin in a manufacturing apparatus of resin products.

4. The test apparatus according to claim 1, wherein the sample is made of a metal material used for a screw or a cylinder in a manufacturing apparatus of resin products.

5. The test apparatus according to claim 1, wherein the jig is rotated, whereby the jig rotates relative to the sample.

6. The test apparatus according to claim 1, wherein the container is rotated to rotate the sample together with the container, whereby the jig rotates relative to the sample.

7. The test apparatus according to claim 1, wherein a wear mark is formed on the surface of the sample by pressing the jig rotating relative to the sample against the surface of the sample.

8. The test apparatus according to claim 1, wherein the solution is an acidic solution or an alkaline solution.

9. A test method comprising steps of:

(a) preparing a test apparatus including a container, a sample, a first metal body, and a second metal body which are immersed in a solution in the container, a jig configured to be pressed against the sample, a current measuring unit, and a voltage measuring unit; and (b) measuring a current between the sample and the first metal body by the current measuring unit and measuring a voltage between the first metal body and the second metal body by the voltage measuring unit while pressing the jig rotating relative to the sample against a surface of the sample, wherein the sample, the first metal body, and the second metal body are made of the same metal material and have the same surface area.

10. The test method according to claim 9 wherein the sample is made of a metal material whose resistance to wear and corrosion is to be evaluated.

11. The test method according to claim 9, wherein the sample is made of a metal material used for a constituent member contributing to kneading of a resin in a manufacturing apparatus of resin products.

12. The test method according to claim 9, wherein the sample is made of a metal material used for a screw or a cylinder in a manufacturing apparatus of resin products.

13. The test method according to claim 9, wherein, in the step (b), the jig is rotated, whereby the jig rotates relative to the sample.

14. The test method according to claim 9, wherein, in the step (b), the container is rotated to rotate the sample together with the container, whereby the jig rotates relative to the sample.

15. The test method according to claim 9, wherein, in the step (b), a wear mark is formed on the surface of the sample by pressing the jig rotating relative to the sample against the surface of the sample.

16. The test method according to claim 9, wherein the solution is an acidic solution or an alkaline solution.

* * * * *